(12) United States Patent
Kopf et al.

(10) Patent No.: US 8,149,886 B2
(45) Date of Patent: Apr. 3, 2012

(54) LASER AMPLIFIER SYSTEM AND LASER AMPLIFIER METHOD

(75) Inventors: Daniel Kopf, Roethis (AT); Juerg Aus Der Au, St. Gallen (CH)

(73) Assignee: High Q Technologies GmbH, Rankwell (AT)

( * ) Notice: Subject to any disclaimer, the term of this patent is extended or adjusted under 35 U.S.C. 154(b) by 175 days.

(21) Appl. No.: 12/431,442

(22) Filed: Apr. 28, 2009

(65) Prior Publication Data

US 2010/0272137 A1    Oct. 28, 2010

(51) Int. Cl.
*H01S 3/13* (2006.01)
*H01S 3/091* (2006.01)
*H01S 3/092* (2006.01)

(52) U.S. Cl. .................................. 372/29.021; 372/71
(58) Field of Classification Search ............... 372/71, 372/29.021

See application file for complete search history.

(56) References Cited

U.S. PATENT DOCUMENTS

| 5,657,153 | A | 8/1997 | Endriz et al. |
| 5,909,306 | A * | 6/1999 | Goldberg et al. .......... 359/337.1 |
| 6,009,110 | A | 12/1999 | Wiechmann et al. |
| 2001/0002915 | A1* | 6/2001 | Komine ............................ 372/9 |
| 2005/0036532 | A1 | 2/2005 | McDonagh |
| 2006/0169677 | A1 | 8/2006 | Deshi |
| 2008/0112041 | A1* | 5/2008 | Clubley et al. ................ 359/305 |
| 2008/0137179 | A1 | 6/2008 | Li et al. |

FOREIGN PATENT DOCUMENTS

GB    2 277 633 A    11/1994

* cited by examiner

*Primary Examiner* — Patrick Stafford
(74) *Attorney, Agent, or Firm* — Muncy, Geissler, Olds & Lowe, PLLC

(57) ABSTRACT

A laser amplification arrangement comprising a laser medium for producing an amplified laser emission as output signal from a useful signal to be amplified and a pump source has a switching component for coupling the useful signal into the laser medium. Laser medium and switching component are formed and arranged so that a division of an input signal (ES) into the useful signal and a background signal is effected, the background signal being passed through the laser medium at a time immediately before and/or after the coupling-in of the useful signal to be amplified.

15 Claims, 10 Drawing Sheets

LASER AMPLIFIER SYSTEM AND LASER AMPLIFIER METHOD

The invention relates to a laser amplification arrangement according to the preamble of claim 1 and a laser amplification method according to the preamble of claim 12.

Ultra-short pulse laser systems, i.e. laser arrangements which are capable of producing laser pulses with a characteristic pulse duration in the femtosecond or picosecond range, have long been known in various embodiments from the prior art, femtosecond and picosecond lasers being used in a growing number of applications of various types. Firstly, these applications always require higher laser powers and laser pulse energies; secondly, this specific application often requires the possibility of switching the pulse on and off virtually arbitrarily from an underlying grid, i.e. from a pulse train as a sequence of many individual pulses. So-called pulse pickers which generally use acousto-optical or electro-optical switching mechanisms are used for this purpose. However, these can no longer be used without problems at relatively high powers of a few 10 W since an excessively high peak power results in the case of acousto-optical modulators owing to the required focusing. Electro-optical modulators, too, have a residual absorption, depending on the crystal which can be used, so that their use at an average power of a few 10 W is already problematic. In addition, the handling of optical elements which have to be adjusted or set is very complicated and susceptible to errors at such high powers, for example if the impingement point of the beam happens to lie in the edge region of the optical element, which can lead to corresponding damage.

One possibility for circumventing these problems lies in the amplification of pulses of lower power, i.e. having powers below the problem-producing threshold, by laser amplification arrangements. Powers of a few 10 W or even a few 100 W are no longer a rarity.

Thus, in the case of excited laser media with high amplification factor, i.e. with a product of effective cross-section and life $\sigma \cdot \tau$ as a "figure of merit" (FOM) for the low-signal amplification, as possessed, for example, by Nd:vanadate, it is still possible to extract a good 50% even in the case of a single pass at a pump power of 100 W. A corresponding approach is disclosed, for example, in US 2005/0036532 A1.

Other approaches use multiple passes through materials having a lower amplification factor. Thus, an amplification of ~2 W to >400 W can nevertheless be achieved with a total of 9 passes through Yb:YAG, this having a substantially smaller $\sigma \cdot \tau$ than Nd:Vanadate, an average femtosecond laser power of more than 400 W thus being achieved at a pump power of 800 W.

A further approach consists in the use of fiber laser amplifiers, in which case powers in the region of several 10 W or several 100 W can likewise be achieved. However, a complicated chirped pulse amplification concept is required for this approach in order to keep the peak powers low for avoiding damage. In such arrangements, the laser medium consists, for example, of Yb:glass in fiber form, this having an even lower amplification factor in comparison with the above materials. However, because the mode does not diverge but, owing to the fiber property, can be kept constant over a length of several 10 cm or even meters, for example in so-called LMA, Large Mode Area Fibers with 20 or 30 μm single mode core diameter, the amplification achieved can nevertheless be high in total, for example with a factor of 100 per stage.

However, the approaches known from the prior art have the disadvantage that the low-signal amplification is substantially higher than the saturated amplification prevailing in constant operation. The result of this is that a substantially higher amplification results on the switching off the coupled-in pulse train. This often results firstly in a "residual" or "parasitic" lasing, i.e. the effect of an undesired, generally continuous laser radiation from the amplifier owing to low residual reflections or ASE—Amplified Stimulated Emission. Secondly, owing to the resulting high amplification due to the high inversion, a relatively high amplification results for the first pulse on switching on the coupled-in pulse train. Finally, the disproportionately high amplification can lead the first pulse or pulse train to high (peak) intensities which are close to or above the optical destruction threshold.

Approaches to date for taking into account these effects require complicated so-called "first-pulse suppression" measures in which the first coupled-in pulse is greatly attenuated in order to obtain the desired pulse energy again in the end.

US 2008/0112041 discloses a concept comprising two resinators, in which it is ensured by means of a second angle-multiplexed resinator which passes through the same laser medium that, when the amplifier stage is switched off, the second resinator runs and keeps the inversion in the laser medium low. As a result, the excessively high amplification on coupling in the pulse to be amplified can be avoided but this arrangement requires the operation of a second laser resonator.

U.S. Pat. No. 6,009,110 presents a concept with complicated control electronics, in which, when the amplifier stage is switched off, a Q-switched laser nevertheless runs in the continuous laser mode and the inversion in the amplifier is thereby likewise kept low. When the Q-switch mode is switched on again, overshooting of the power of the first pulse is then reduced. Owing to the downstream frequency conversion used, the continuous laser emission does not play a major role, which, however, is disadvantageous in other applications.

An object of the present invention is the provision of an improved laser amplification arrangement or an improved laser amplification method for producing femtosecond or picosecond pulses.

A further object is the provision of such a laser amplification arrangement which, with little complexity of the design and of the operation of a pulse amplification, reduces or suppresses overshooting and undershooting effects in the amplifier medium.

A further object is the provision of a laser amplification arrangement or an improved laser amplification method for producing femtosecond or picosecond pulses, which permits operation with low pulse repetition rates without reaching the optical destruction threshold.

A further object is the provision of laser amplifier arrangement having greater compactness and robustness.

A further object is the provision of a laser amplifier arrangement having a function for optional coupling-out of a pulse with substantial suppression of the first pulse.

These objects are achieved by the subjects of claim 1 or 12, respectively, or of the dependent claims or the solutions are further developed.

The invention relates to a laser amplification arrangement and a laser amplification method, in particular for amplifying femtosecond or picosecond pulses, comprising a laser medium for producing an amplified laser emission, it being possible for this typically to have an average power of more than 10 W or more than 100 W. A useful signal to be amplified, i.e. as a rule a single pulse coupled out from a pulse train or a limited number of single pulses, is passed through a laser medium optically pumped by a pump source, in particular a laser diode source. The timing and switching of the process are effected by a switching component which serves for optically coupling the useful signal into the laser medium.

The achievement according to the invention is based on the approach of using the emission of the source used for producing the pulses also for controlling the inversion and hence the amplification of the laser medium. For this purpose, a background signal which is used for controlling the inversion in the laser medium and hence the amplification factor when the amplification function is switched off, i.e. in a time during which no useful signal is to be amplified, is produced from the input radiation fed into the amplifier arrangement. By means of the background signal, the laser medium can be continuously kept in a defined, saturated state, into which the useful signal is then coupled for amplification, so that the otherwise occurring overshoots of the first pulse are avoided. The input signal serves both as a source of the background radiation and for providing the useful signal to be amplified. Through this approach, amplified pulses can be coupled out at any time and on demand without complicated regulations or controls being required. The concept according to the invention can be applied to a multiplicity of amplifier types, for example to single or multiple passes through different geometries and media, in particular in fiber amplifier stages.

According to the invention, laser medium and switching component are formed and arranged in such a way that a saturation state of the laser medium is brought about by the background signal, the useful signal being coupled into the laser medium when the saturation state is present. The power of the input signal can be switched back and forth either completely or in a ratio, for example with a division into 80% and 20% of the power of the input signal, between useful signal and background signal, in both cases the sum of the powers of useful and background signal being constant and corresponding to that of the input signal. Thus, for example during the switched-off state, the total power of the input signal can be fed as a background signal via a first beam path into the laser medium, resulting in a saturation here. The background signal amplified in the laser medium can subsequently be passed into an optical trap so that no laser light leaves the amplifier system.

For amplifying a useful signal, the input signal is now passed as a useful signal via a second, different beam path, which likewise runs through the laser medium, but subsequently leaves the amplifier as useable emission, i.e. in contrast to the amplified background signal, is not passed into an optical trap. Since the same input signal is used in both cases, the properties of the radiation are substantially identical in both cases. Moreover, the switching process can be effected by a single component, so that synchronization necessarily takes place without complex and expensive realization and control of two radiation sources or resonators being required.

In addition to the complete switching of the power of the input signal between background and useful signal, a division of the power over both signals can also be effected so that a certain minimum power of each signal is always present. By means of the switching process or the process for coupling the useful signal into the laser medium, the ratio is inverted.

Suitable switching components are available in the form of electro-optical and acousto-optical modulators, separability of the two signals being ensured on the basis of the polarization, the beam direction and/or their angle of emergence on leaving the switching component. If a different polarization of the two signals is used, these can be passed at least partly via a common beam path, with the result that the laser arrangement acquires a simpler design. The two beam paths may also have a partly identical three-dimensional course if separation or separability of their two different signals within the laser medium is possible. This separability can be effected, for example, by a different three-dimensional course, opposite beam and propagation directions, different frequency and/or different polarization directions or on the basis of further beam parameters.

In general, in all embodiments, the input signal may be a continuous laser beam or a pulsed laser beam of arbitrary pulse length, for example also in the nanosecond range. In particular, suitability exists for a pulse train of a femtosecond or picosecond laser, which pulse train is mode-coupled or is mode-coupled by Q-switching and from which individual pulses or defined pulse sequences with a predetermined energy profile as a function of time are then used as a useful signal.

The laser amplification arrangement according to the invention and the laser amplification method according to the invention are described in more detail or illustrated below, purely by way of example, with reference to working examples shown schematically in the drawing. Specifically, FIG. 1 shows the schematic diagram of a first working example of the laser amplification arrangement according to the invention;

Figure 1:
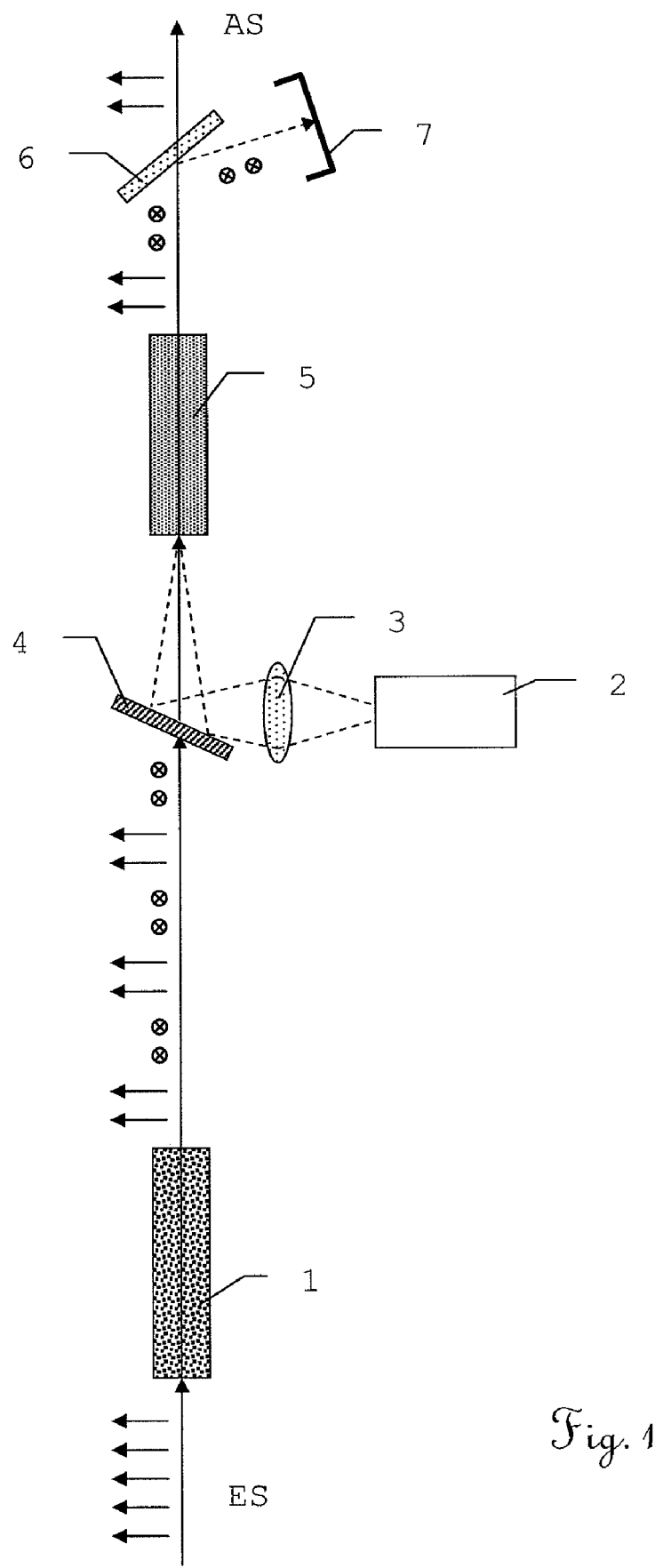
FIG. 1A shows the schematic diagram of a first example for a divided laser medium for the first working example.
FIG. 1B shows the schematic diagram of a second example for a divided laser medium for the first working example.
Figure 1:
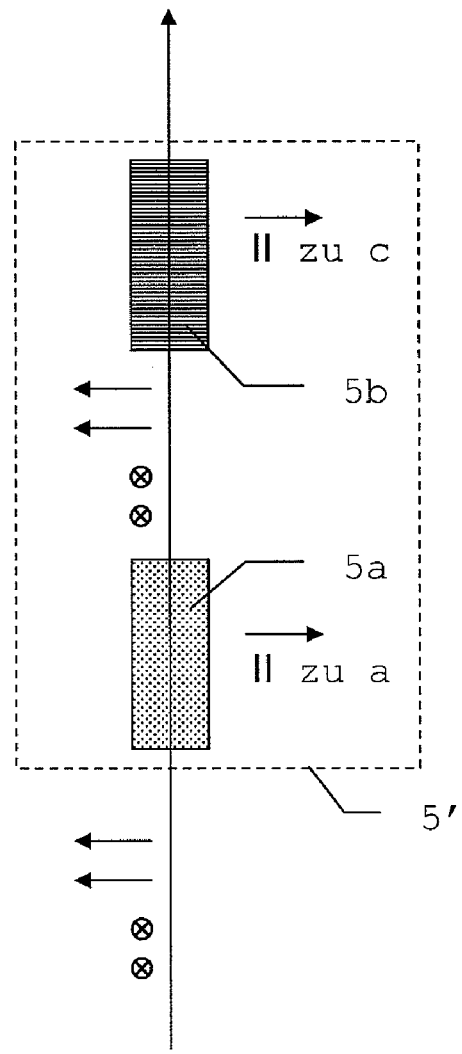
Figure 1:
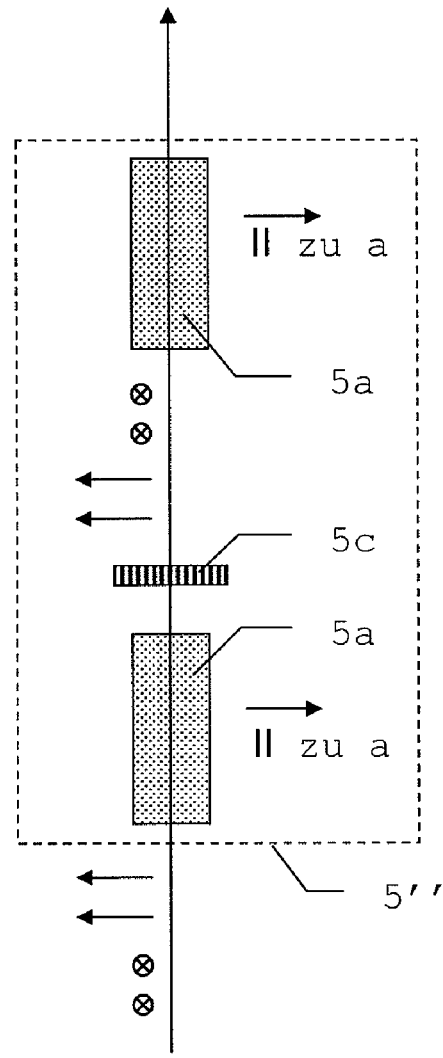

FIG. 1 shows the schematic diagram of a first working example of the laser amplification arrangement according to the invention, comprising a laser medium 5 for producing an amplified laser emission AS from a useful signal to be amplified. The laser medium is pumped by a pump source 2, in particular a laser diode source. The radiation of the pump source 2 is coupled via a lens 3 and a dichroic beam splitter 4 into the common beam path of background and useful signal, so that, in this example, the laser medium 5 is pumped through its end face.

An electro-optical modulator is used as switching component 1 for coupling the useful signal to be amplified into the laser medium 5 by rotating the polarization direction of the input signal ES. Thus, the polarization of the input signal ES coupled into the amplifier arrangement can be changed as required by varying the voltage applied at the switching component 1, for example from p-polarized at an applied voltage of zero to s-polarized at an appropriately applied half-wave voltage. Together with a downstream polarizer, a conventional so-called pulse picker arrangement would result. Such arrangements use, for example, beta-barium borate (BBO) as a material for the electro-optical modulator or a "Pockels cell" and a thin-film polarizer or a polarizing beam splitter cube as a downstream polarizer element. Suitable high-voltage electronics can achieve high-voltage pulses for switching up to one MHz or higher pulse picking rate, depending on the design and required voltage. The latter depends substantially on the crystal height or length, according to whether the voltage is applied longitudinally or transversely, and therefore also on the possible focusing. Here, it is also evident that, at very high powers of several 10 or hundreds of watts, a limit of the pulse repetition rate is reached more rapidly, and hence the pulse picking before the amplifier has advantages not only with regard to the simpler handling of lower powers but also with regard to the achievable pulse switching frequency. By switching back and forth between the polarization states, the input signal ES is used firstly as a useful signal and secondly as a background signal in the case of a common beam path up to the laser medium 5 or thin-film polarizer 6. According to the invention, the optionally p- or s-polarized input laser radiation is therefore separated not before the amplifier arrangement or the laser medium 5 but only thereafter. The designations p-(parallel)- and s-(sagittal)-polarization used here correspond terminologically also to the usual designation of h-(horizontal)- and v-(vertical)-polarization.

Instead of an electro-optical modulator, it is also possible according to the invention to use an acousto-optical modulator in which the zeroth and the first order have different polarizations.

Polarizing beam splitter optical systems are available for very high powers with large apertures so that the use thereof presents no technical problem even at a few 100 W and is also easy to carry out.

When choosing the laser amplifier, it should be ensured that both polarizations s and p are implemented in the laser medium 5 and ensure a desired elimination of the inversion. In the case of laser crystals as laser medium 5, it is possible firstly to choose the orientation so that the two polarization directions have the same saturation effect, i.e. the same effective cross-section σ (and the same life), or it is possible to realize as a compromise that, with different effective cross-sections σ, not complete but at least the best possible suppression of the first pulse problem is achieved for one of the two polarization directions. This is the case, for example, with Nd:vanadate, where the polarization advantageously runs along the c-axis since this is best amplified. However, the other polarization direction then inevitably runs along one of the two other a-axes and experiences a smaller amplification and saturation. Alternatively, however, it is also possible to choose a crystal orientation in which both polarizations run along a a-axis. The background signal thus gives rise to a saturation state of the laser medium 5, the useful signal being coupled into the laser medium 5 in the presence of this saturation state by switching of the polarization. In both states, the laser medium 5 is therefore operated in a substantially identical saturation state.

A horizontal or vertical polarization or a p- or s-polarization is therefore present after the switching component 1, depending on the switching state. As a result of this design and the chosen sequence, laser medium 5 and switching component 1 are formed and arranged so that a division of an input signal ES into the useful signal and a background signal with different polarizations takes place, it being possible, by appropriate actuation of the switching component 1, for the background signal to be passed through the laser medium 5 at a time immediately before and/or after the coupling-in of the useful signal to be amplified. In contrast to conventional pulse picker arrangements, the thin-film polarizer 6 used for the signal separation is arranged, according to the invention, after the laser medium 5. Depending on the switching state of the switching component 1 and hence on the polarization direction, the input signal ES now serving as a useful signal is coupled out of the arrangement after its amplification as output signal AS or, with a different polarization, is passed as a background signal into an optical trap 7.

FIGS. 1A and 1B show two examples of a divided laser medium, which examples can be used in laser amplification arrangements according to the invention. However, the concept of dividing the laser medium is a solution which, independently of the laser amplification arrangement according to the invention or the laser amplification method according to the invention, can also be used in other arrangements and methods, in particular in ultra-short pulse laser systems. Such laser arrangements or laser amplification arrangements typically have, in addition to the laser medium, a pump arrangement for optical pumping of the laser medium, switching components for coupling in or coupling out laser pulses and—depending on the design—in certain circumstances also a resinator. To this extent, these designs of laser media are independent of the invention described.

The object of this specific configuration is to permit, for laser media with anisotropy, an adapted power consumption for two or more signals with characteristics or signal parameters differing with respect to the existing anisotropy. Here, either the power consumption in the two components can be the same or can be consciously kept different.

For this purpose, the laser medium has at least two components comprising laser-amplifying material; in a first variant shown in FIG. 1A, the at least two components are oriented differently, in particular rotated, relative to one another with their anisotropy direction, i.e. the direction with a respect to which such anisotropy exists.

Another variant shown in FIG. 1B is likewise based on the separation of the laser medium into at least two components but uses an optical component to change, in particular to rotate, the beam path of the two signals which is passed through the laser medium, between the first and the second component, in its direction effective with respect to the anisotropy.

Both approaches, i.e. the rotation or change of the components with unchanged beam path of the signals or the rotation or change of the beam path with unchanged anisotropy direction of the components, can, however, also be combined by changing both beam path and anisotropy direction between the components of the laser medium. Thus, for example also in the case of a three-part laser medium, the signal orientation, e.g. the polarization directions, can be rotated between the first two components at the first division by changing the beam path and the anisotropy direction of the second and third component can be changed between the last two components at the second division. Likewise, both the signal orientation and that of the components can also be changed at the same time in a division, i.e. at a transition point between two components.

In addition, a different doping or length or geometry can be chosen for the components of the laser medium. By means of these degrees of freedom provided thereby, a desired power consumption or saturation behavior can be established via the laser medium or its components.

Below, a two-part embodiment of the laser medium for polarization-separated beam paths, i.e. a spatially common beam path with signal components of different polarization directions, is illustrated purely by way of example in FIGS. 1A and 1B.

FIG. 1A shows the schematic diagram of a first example for a divided laser medium 5' for the first working example. In this example, Nd:vanadate is used as material for the laser medium 5', two identical components 5a and 5b being arranged side by side, but a different orientation being implemented. In this case, the first component 5a is oriented with the anisotropy direction parallel to the p-polarization, and the second component parallel to the s-polarization. Thus, independently of the switching state, i.e. the rotation of the polarization directions, a constant saturation or a reduction or prevention of the different saturation behavior of the two polarization directions is brought about.

Thus, a change of the orientation of the crystal after a certain length, i.e. for example after the first half or the first third, takes place here. Until there, the crystal is oriented so that the c-axis is horizontal and the a-axis is vertical, and vice versa thereafter. This arrangement of two separate laser crystal parts can be realized in a separated manner, preferably with an antireflection coating between the components, or by a connection to a single part. Such a connection, optionally likewise with an antireflection coating, can be realized by bonding techniques of the prior art, such as, for example, diffusion bonding, optical bonding, etc, with the result that the crystal still represents a single optical element.

FIG. 1B shows the alternative variant of the laser medium 5" with a rotation of the polarization direction between the identical and identically oriented components 5a as a second example of a divided laser medium 5" for the first working example of the laser amplifier arrangement. Here, an element 5c which effects the rotation of the polarization directions is arranged between the identically oriented components 5a arranged a distance apart. This variant, too, can be realized in a monolithic design by connecting the components 5a to a polarization-rotating coating between the crystal parts.

Figure 2:
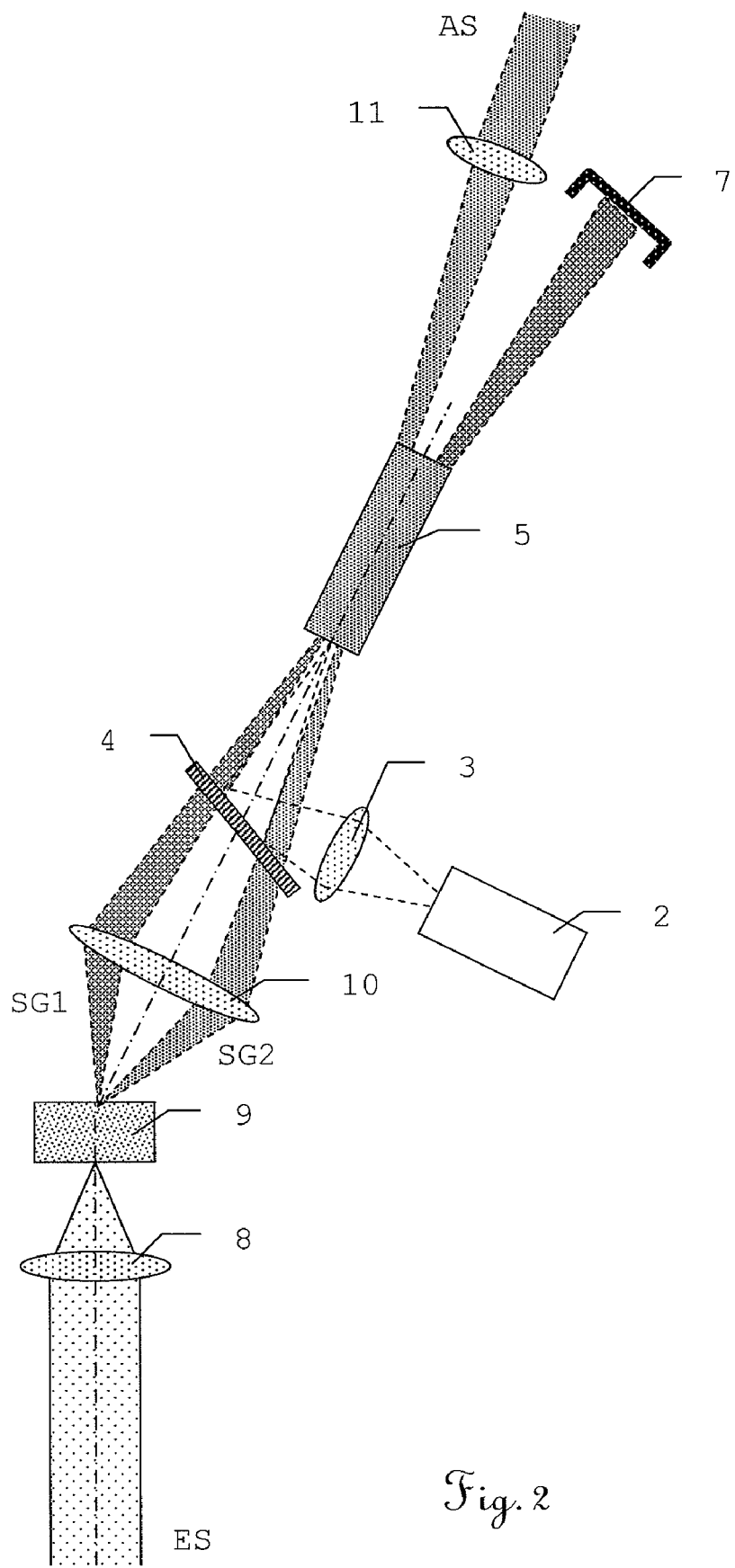
FIG. 2 shows the schematic diagram of a second working example of the laser amplification arrangement according to the invention.

A second working example of the laser amplification arrangement according to the invention is illustrated in FIG. 2. In this example, instead of an electro-optical modulator, an acousto-optical modulator is used as switching component 9, so that useful signal and background signal can be separated from one another after the modulator on the basis of their angle of emergence. The input signal ES is coupled into the acousto-optical modulator via a lens 8, this defining two separate beam paths SG1 and SG2 for background and useful signal by two switching states with different angles of emergence from the switching component 9. In the first switching state, the input signal ES is passed as a background signal in a first beam path SG1 via a lens 10 and a dichroic beam splitter 4, serving for coupling in the pump light originating from the pump source 2, into the laser medium 5, where saturation is effected. After leaving the laser medium 5, the amplified background signal is passed into an optical trap 7 present in the first beam path SG1.

By switching the switching component 9 to the different switching state, the input signal ES is now passed as a useful signal via the beam path SG2 into the laser medium 5. This likewise has lens 10 and dichroic beam splitter 4, but the amplified useful signal, after leaving the laser medium 5, is passed via a collimating lens 11 and emitted as output signal AS from the arrangement. In this arrangement, it is advantageous to send both laser beams with as small an angular spacing as possible through the excited part of the laser medium so that substantially the same regions are covered by the two beam paths SG1 and SG2 within the laser medium 5.

In one variant, the arrangement can, however, also be designed according to the invention so that the input signal is passed not only completely into one of two alternative beam paths but that a division of the power over the various beam paths is effected, so that gradual states are present in between, e.g. with 20% power of the input signal ES in the useful signal and 80% power in the background signal. On switching for emission of the amplified output signal, this ratio would then be inverted, i.e. with 80% power of the input signal ES in the useful signal and 20% power in the background signal.

In this example too, as in FIG. 1, the pulse picking is once again carried out before the laser medium 5 as amplifying element.

Instead of an acousto-optical modulator, it is also possible according to the invention to use an electro-optical deflector which changes the angle of emergence of the emerging beam on application of a voltage.

Figure 3:
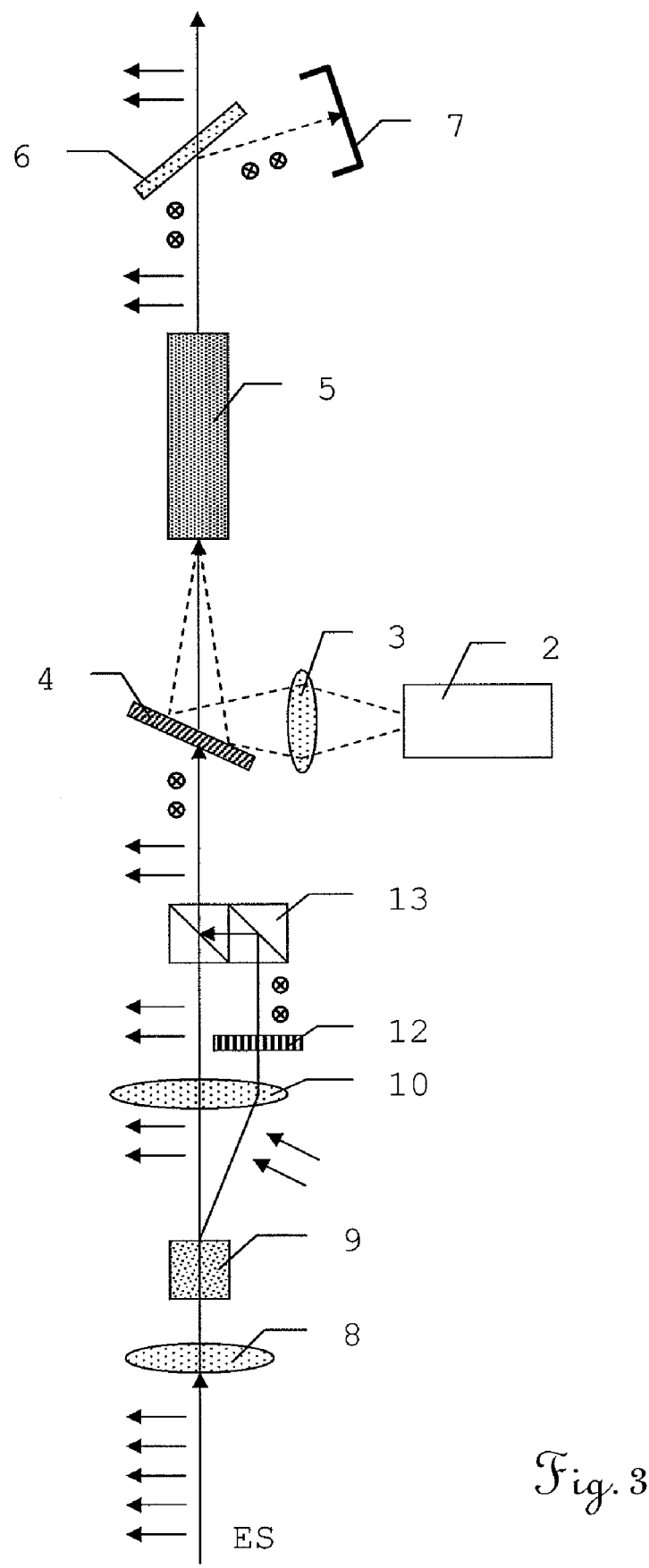
FIG. 3 shows the schematic diagram of a third working example of the laser amplification arrangement according to the invention.

FIG. 3 shows the schematic diagram of a third working example comprising an acousto-optical modulator as switching component 9' and polarization-dependent separation of useful and background signal. In this example, too, the input signal ES is passed via a lens 8 into an acousto-optical modulator as switching component 9', this in turn defining two beam paths with different angles of emergence. In one of the two beam paths, a half-wave plate 12 is arranged downstream of the switching component 9 so that the polarization of the signal fed via this beam path is rotated by said half-wave plate. After the half-wave plate 12, the two beam paths of useful signal and the background signal are combined again via an element 13 comprising mirror and beam splitter cube so that the following arrangement corresponds to the example from FIG. 1 and a separation of useful and background signal on the basis of their different polarization is possible after the laser medium 5 by a thin-film polarizer 6. In this example, the background signal is fed via the half-wave plate 12 and changed in polarization direction compared with the initial polarization. However, it is also possible, according to the invention, to pass the useful signal via this beam path, in which case the background signal is passed directly and without polarization change into the laser medium 5.

This third working example embodies a combination of the two abovementioned working examples from FIG. 1 and FIG. 2: firstly, the technically simpler acousto-optical modulator is used for the pulse picking; secondly, the two signals, i.e. both the useful signal and the background signal, are superposed thereafter by means of polarization coupling. This results in the advantage of a simpler electronic arrangement on the one hand and the possibility of flexible use of all abovementioned amplifier arrangements, provided that they amplify both polarization directions. The separation is then effected once again by means of a polarizing beam splitter or, in this example, by means of thin-film polarizer 6 after the laser medium 5 as an amplifier stage or optionally also at the end of a plurality of such amplifier stages.

In this arrangement, it is also possible, by a suitable embodiment, known to the person killed in the art, of the optical system, with which the two beams are superposed by means of polarization coupling, to establish a larger or smaller beam diameter in the case of one of the two polarized signals or beam paths in order to compensate any smaller effective cross-section σ for the respective polarization direction and to achieve the same or approximately the same saturation as for the other polarization direction.

It is also possible, by a suitable embodiment, known to the person skilled in the art, of the optical system, to incorporate attenuation in the case of one of the two polarized signals or beam paths in order to compensate the effect of any higher effective cross-section a for the respective polarization direction and in the end once again to obtain a constant inversion, substantially independent of the switching state, in the amplifier stage.

Figure 4:
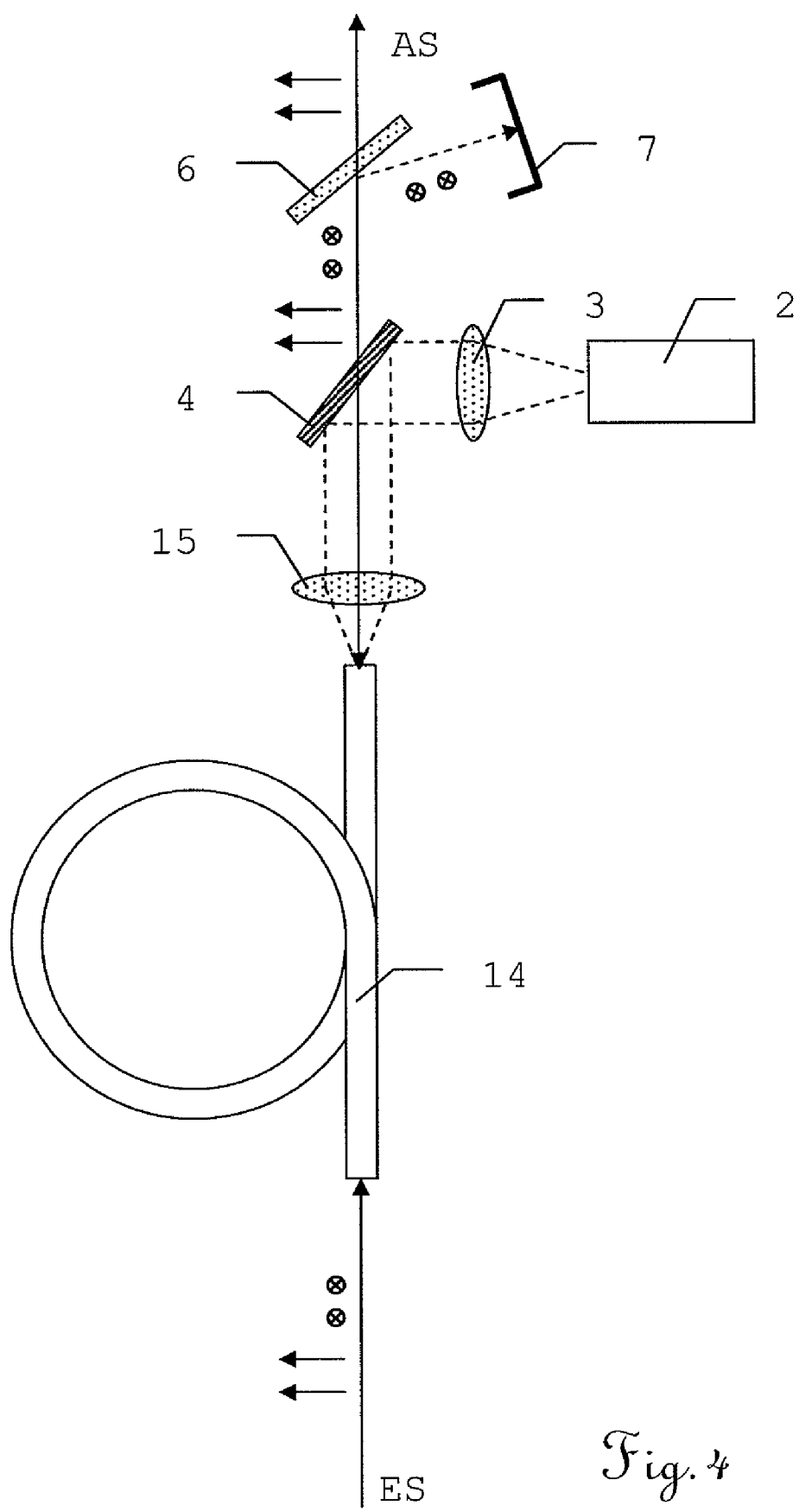
FIG. 4 shows the schematic diagram of a fourth working example of the laser amplification arrangement according to the invention.

FIG. 4 shows the schematic diagram of a fourth working example as a laser fiber amplifier comprising a fiber as laser medium 14, which fiber is pumped from one side by a pump source 2 with an optical system comprising two lenses 3 and 15 and a dichroic beam splitter 4. In this example, a so-called PM fiber is used as the polarization-preserving optical fiber, it being possible for either an electro-optical modulator according to the first working example from FIG. 1 or an acousto-optical modulator with a polarization-changing component in one of the two beam paths separated in an angle-dependent manner, according to the third working example from FIG. 3, to be connected upstream of the laser medium 14. The fiber used may also be a so-called "rod-type" fiber or a so-called photonic crystal fiber, which permits even higher single-mode core diameters and hence even higher (peak) powers.

Figure 5:
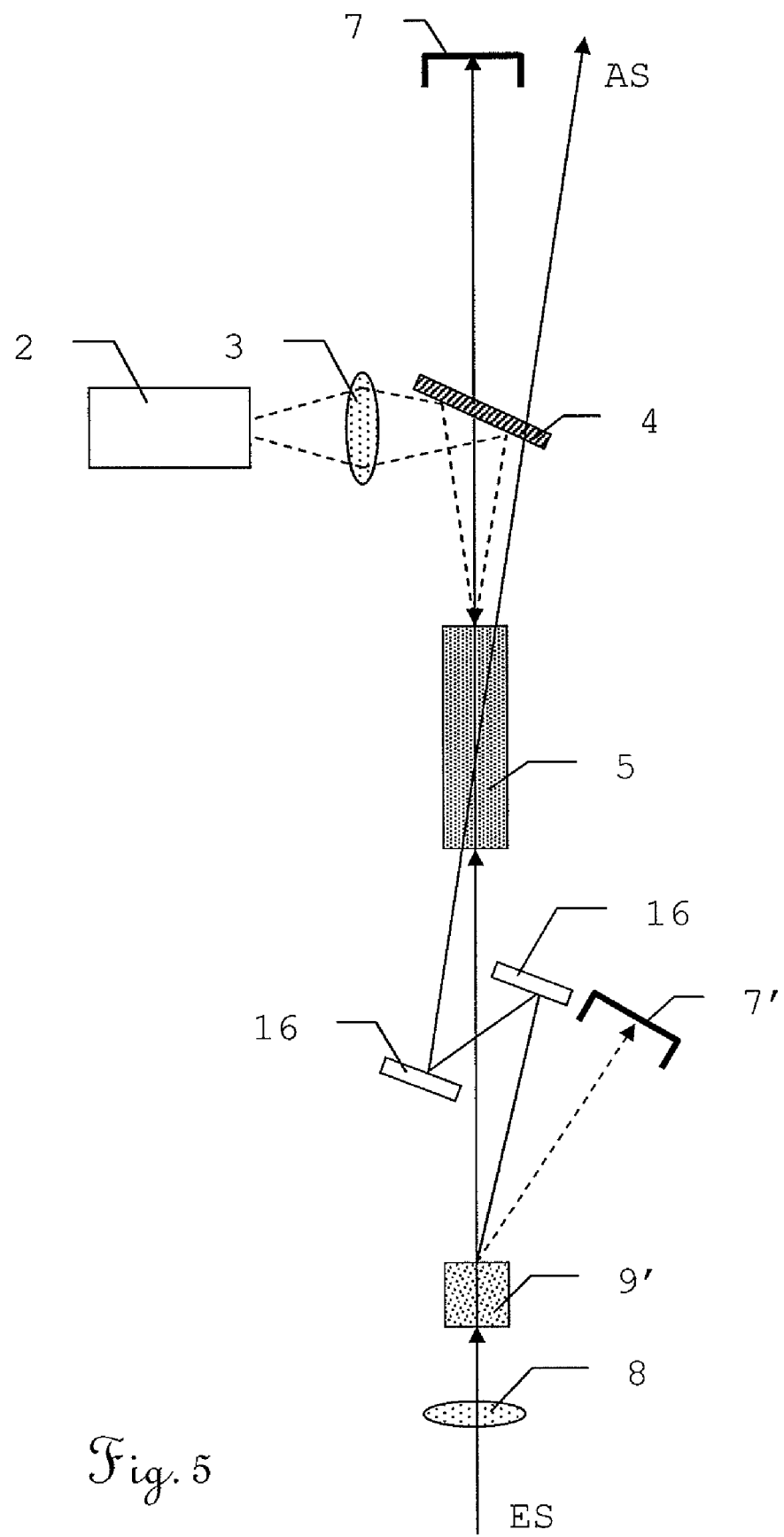
FIG. 5 shows the schematic diagram of a fifth working example of the laser amplification arrangement according to the invention.

FIG. 5 shows the schematic diagram of a fifth working example of the laser amplification arrangement according to the invention, comprising an acousto-optical modulator with three switching states as switching component 9'. In this fifth working example, as in the second working example according to FIG. 2, an acousto-optical modulator is used, but this also defines three different beam paths by three switching states with coordinated angles of emergence. While two beam paths are used for the useful signal and the background signal in a manner analogous to the arrangement according to FIG. 2, the third beam path—without having the laser medium 5—is led directly into an optical trap 7'. Thus, this beam path is optically interrupted with respect to the laser medium 5 and does not lead to amplification of a signal passed via this path. The input signal ES can therefore be fed either as a useful signal or as a background signal through the laser medium 5 or directly into the optical trap 7'.

For realizing the three switching states, the acousto-optical modulator may be actuated as switching component 9' with two different frequencies $f_1$ and $f_2$, where $f_1$ effects a deflection of the beam into the ON state or into the useful signal and $f_2$ effecting a deflection of the beam into the optical trap 7'. Thus, there is also the possibility of producing the state of complete or at least substantial inversion in the laser medium 5, which state occurs in the case of prior art solutions. Thus, it is possible, by this targeted deflection of the input signal into the optical trap 7' for a period T, further to increase the stored energy in the laser medium 5 by an energy quantity which corresponds to the product of duration and pump power in the laser medium 5 since, during this period T, the inversion is not requested. In any case, for periods which are substantially shorter than the life of the upper level of the laser medium, the product of duration and pump power is a good approximation which is in the 100 μs range in the case of Nd:vanadate, 300 μs in the case of Yb:KYW and 1 ms in the case of Yb:YAG. The first pulse after the elapse of T, which is then immediately input into the useful signal, thus encounters an overshot inversion and hence also an overshot amplification, so that the energy of this pulse is correspondingly higher in the useful beam. For presentation reasons, no further lens elements apart from the lens 8 are shown in FIG. 5; however, such lens elements can be inserted appropriately into the beam path, depending on the required beam radius.

This arrangement therefore implements a laser amplifier which can simultaneously realize two sets of specifications: (1) high-frequency pulse sequence (e.g. in the kHz to MHz range) and high-frequency switching (i.e. pulse polling in the MHz range) with continuously high saturation of the amplifier and constant load on the one hand and (2) low-frequency pulse sequence (e.g. in the Hz to kHz range) and low-frequency switching (i.e. pulse polling in the kHz range) with comparatively high inversion and amplification on the other hand.

Figure 6:
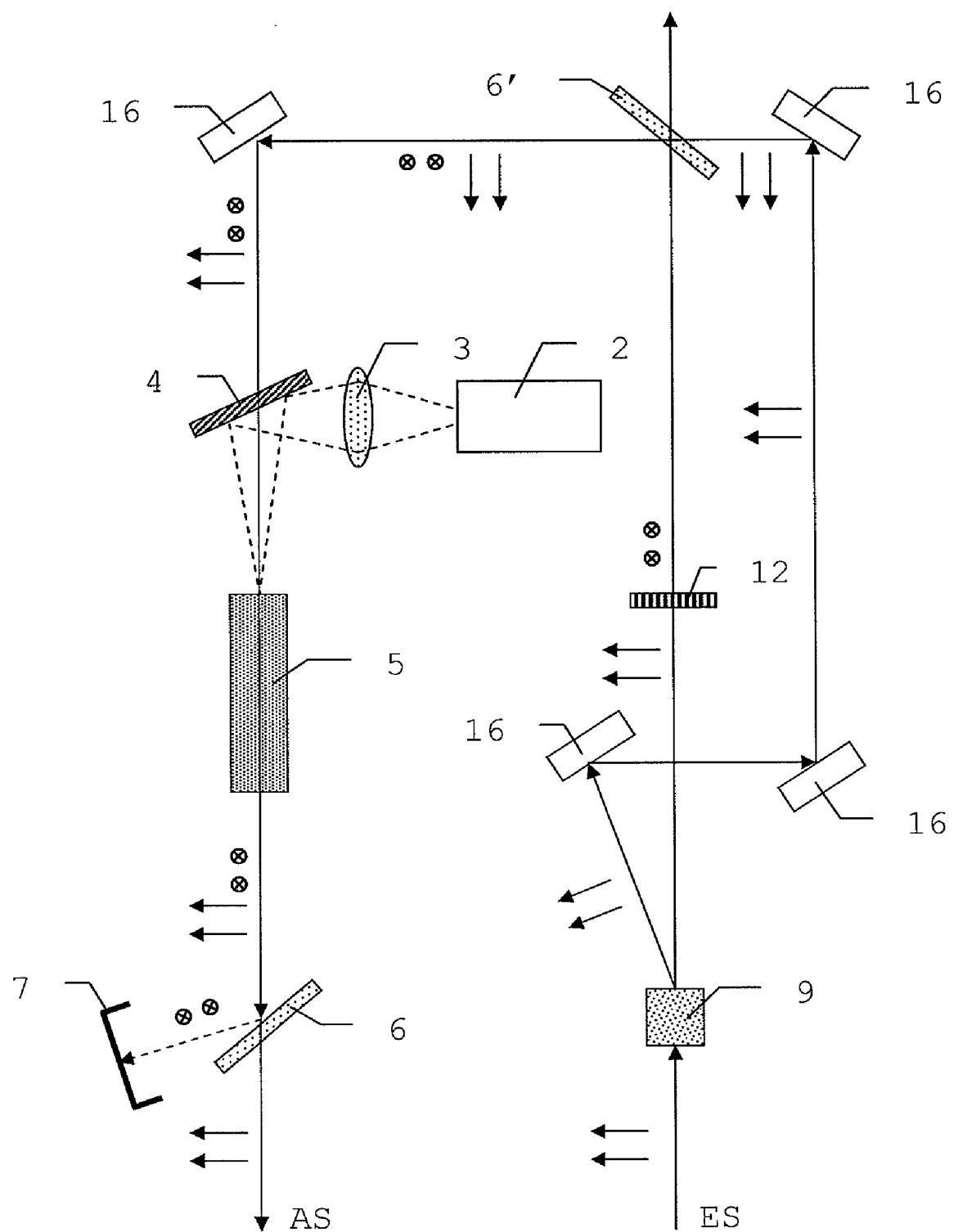
FIG. 6 shows the schematic diagram of a sixth working example of the laser amplification arrangement according to the invention.

FIG. 6 shows the schematic diagram of a sixth working example of the laser amplification arrangement according to the invention having a compact design and a switching principle corresponding to the third working example. The switching component 9 used is likewise an acousto-optical modulator with downstream half-wave plate 12, so that separation of useful and background signal is possible on the basis of the polarization. However, the beam for the useful signal is led via a sequence of mirrors 16 in a folded manner, a beam path through the laser medium 5, superposed with the background signal, following after a thin-film polarizer 6'.

Figure 7:
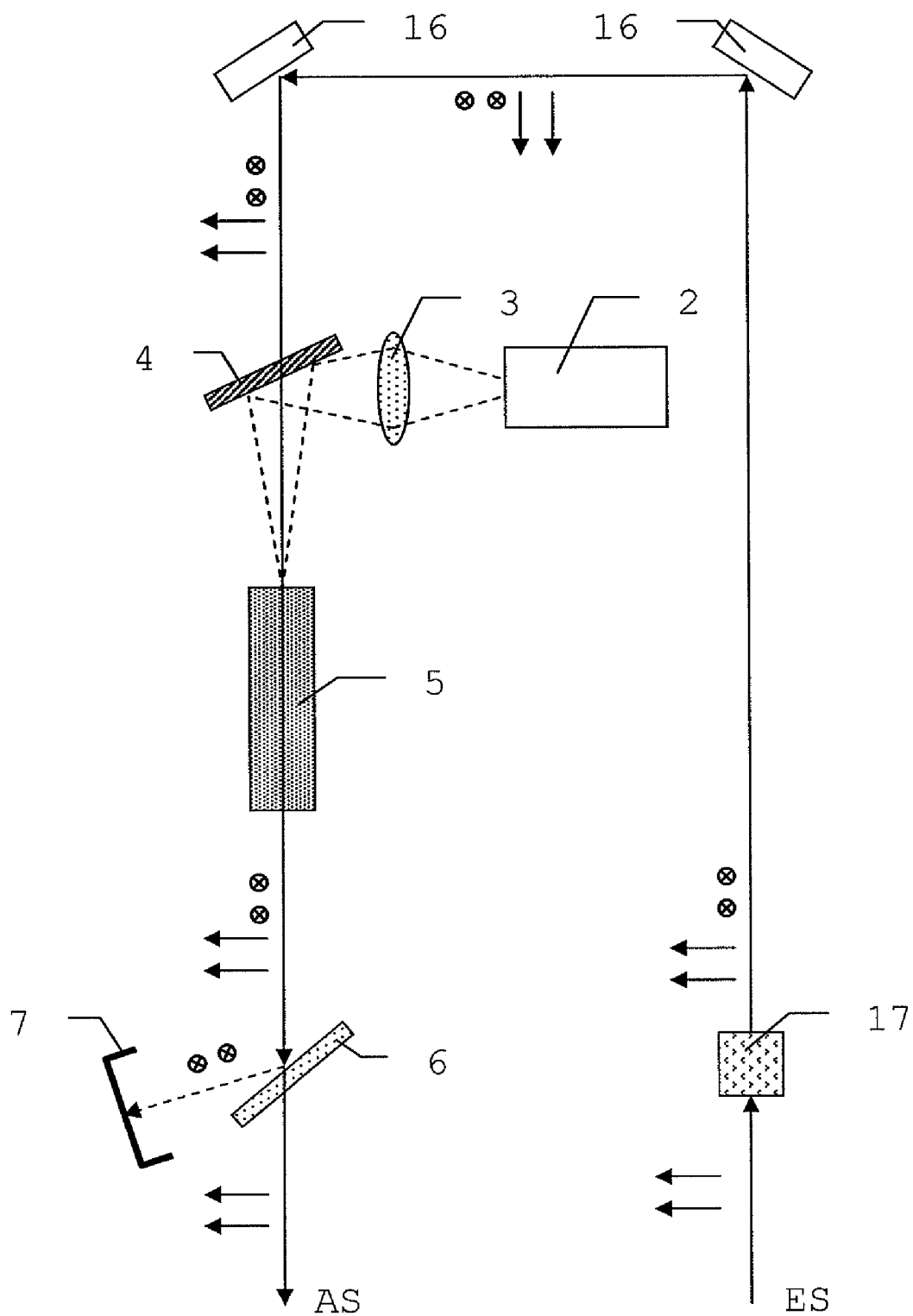
FIG. 7 shows the schematic diagram of a seventh working example of the laser amplification arrangement according to the invention.

A further alternative for a switching component 17 is shown in FIG. 7 as a seventh working example of the laser amplification arrangement according to the invention. In a folded and compact beam path similar to the sixth working example and having a plurality of mirrors 16, a collinear, acousto-optical tunable filter (collinear anisotropic AOTF) is used, so that useful signal and background signal have different p- and s-polarizations and are correspondingly separable.

Figure 8:
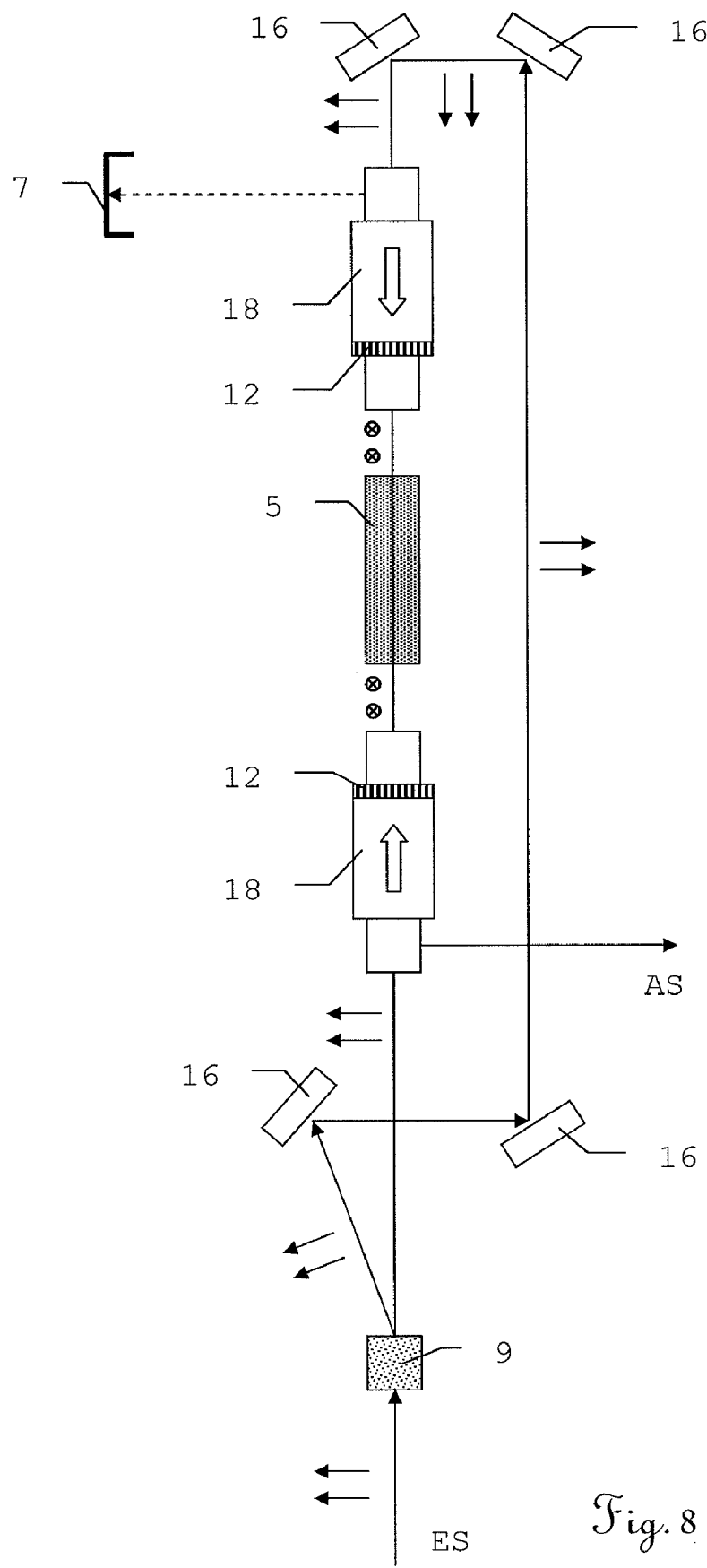
FIG. 8 shows the schematic diagram of an eighth working example of the laser amplification arrangement according to the invention and FIG. 9 shows the schematic diagram of a ninth working example of the laser amplification arrangement according to the invention.
Figure 9:
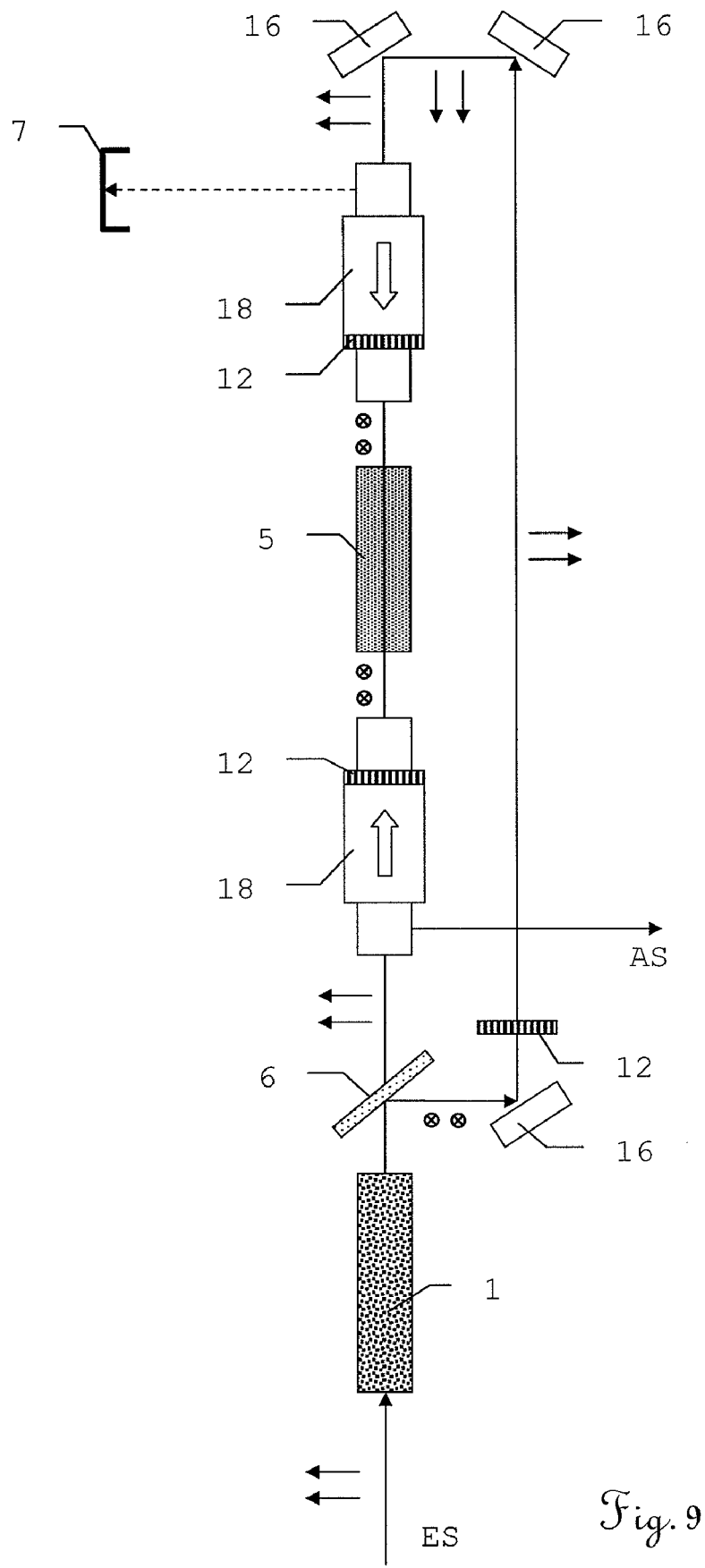

FIG. 8 and FIG. 9 show an eighth and ninth working example of the laser amplification arrangement according to the invention, in which in each case separability of the signals is effected by their beam direction and the laser medium 5. For this purpose, useful and signal and background signal are passed with identical polarization but with different directions via Faraday isolators 18 with half-wave plates 12 into the laser medium 5. Depending on a switching state of the switching component and hence on the polarization direction, the input signal ES now serving as a useful signal is coupled out of the arrangement as output signal AS after its amplification or, in the case of a different polarization, is passed as a background signal into an optical trap 7. The eighth and ninth working examples differ here in the configuration of the switching process and of the switching components. In both cases, the radiation of useful and background signal is passed with the same polarization direction through the laser medium 5 so that different saturations in anisotropic media are avoided from the outset.

Thus, the switching component 9 used in FIG. 8 is an acousto-optical modulator whose zeroth order is passed, as a first switching state, for example for the background radiation, directly via the Faraday isolator into the laser medium 5 and subsequently into the optical trap 7. In the second switching state, the associated beam path of the useful system is passed via a sequence of mirrors 16 from the opposite side via a further Faraday isolator 18 into the laser medium 5 and subsequently as output signal AS out of the laser amplification arrangement.

On the other hand, the ninth working example of the laser amplification arrangement according to the invention, shown in FIG. 9, uses, with basically the same concept of the opposite beam directions of useful and background signal in the laser medium, an electro-optical modulator as switching component 1. This rotates the polarization direction on switching, so that separation of useful and background signal by a thin-film polarizer 6 is possible. The useful signal switched by the rotation of the polarization direction must be rotated again by a half-wave plate 12 after deflection via a sequence of mirrors 16, so that it is passed through the laser medium 5 with a polarization direction identical to the background signal.

The pump arrangement for the laser medium was not shown either in FIG. 8 or in FIG. 9, merely for the sake of clarity. However, said pump arrangement can be integrated into the setup in a manner analogous to the other embodiments.

The examples are shown only schematically and for illustrating the laser amplifier arrangement according to the invention, so that there is no exact reproduction, true to scale, of the relative sizes, distances between the components or angles.

The invention claimed is:

1. A laser amplification arrangement, in particular for amplifying femtosecond and picosecond pulses, comprising at least
    a laser medium for producing an amplified laser emission as output signal (AS), in particular having an average power of more than 10 W or more than 100 W, from a useful signal to be amplified,
    a pump source, in particular a laser diode source, for pumping the laser medium,
    a switching component for coupling the useful signal into the laser medium,
wherein laser medium and switching component are formed and arranged in such a way that a division of the input signal (ES) into the useful signal and a background signal is effected, in particular with the constant sum of useful signal power and background signal power, the background signal being passed through the laser medium at a time immediately before and/or after the coupling-in of the useful signal to be amplified.

2. The laser amplification arrangement as claimed in claim 1, wherein laser medium and switching component are formed and arranged in such a way that a saturation state of the laser medium is produced by the background signal, the useful signal being coupled into the laser medium when the saturation state is present.

3. The laser amplification arrangement as claimed in claim 1, wherein the power of the input signal (ES) can be switched back and fourth either completely or in a ratio between useful signal and background signal.

4. The laser amplification arrangement as claimed in claim 1, wherein useful signal and background signal can be separated from one another on the basis of angle of emergence, beam direction in the laser medium or polarization.

5. The laser amplification arrangement as claimed in claim 1, wherein the division of the input signal (ES) is effected by the switching component.

6. The laser amplification arrangement as claimed in claim 5, wherein the switching component is
    an electro-optical modulator,
    an acousto-optical modulator in which the zeroth and the first order have different polarizations or
    an acousto-optical tunable filter, in particular a collinear one,
useful signal and background signal being separable on the basis of their different polarizations.

7. The laser amplification arrangement as claimed in claim 6, wherein the laser medium is a polarization-preserving optical fiber.

8. The laser amplification arrangement as claimed in claim 6, wherein the polarization directions of useful signal and background signal in the laser medium are chosen so that both polarization directions produce an identical saturation effect.

9. The laser amplification arrangement as claimed in claim 6, wherein the laser medium has a polarization-dependent anisotropy direction and consists of at least two components,
    the at least two components being oriented rotated relative to one another and/or
    a rotation of the polarization directions of useful signal and background signal being effected between the at least two components.

10. The laser amplification arrangement as claimed in claim 1, wherein the switching component is
    an acousto-optical modulator or
    an electro-optical deflector
having at least two switching states with different angles of emergence, the switching states being coordinated in each case with the useful signal and with the background signal, in particular with a downstream half-wave plate and a combination of the beam paths of useful signal and background signal.

11. The laser amplification arrangement as claimed in claim 10, wherein the acousto-optical modulator or the electro-optical deflector has three switching states, a beam path belonging to one of the three switching states being optically interrupted with respect to the laser medium, in particular by an optical trap.

12. A laser amplification method for an input signal (ES) to be amplified, in particular for amplifying femtosecond or picosecond pulses, comprising at least
    optical pumping of a laser medium,
    coupling of a useful signal to be amplified into the laser medium,
    production of an amplified laser emission as output signal (AS), in particular having an average power of more than 10 W or more than 100 W, by the laser medium,
wherein a division of an input signal (ES) into the useful signal and a background signal is effected, in particular with a constant sum of useful signal power and background signal power, the background signal being passed through the laser medium at a time immediately before and/or after the coupling-in of the useful signal to be amplified.

13. The laser amplification method as claimed in claim 12, wherein a saturation state of the laser medium is produced by the background signal, the useful signal being coupled into the laser medium when the saturation state is present.

14. The laser amplification method as claimed in claim 12, wherein the power of the input signal (ES) is switched back and forth either completely or in a ratio between useful signal and background signal.

15. The laser amplification method as claimed in claim 12, wherein useful signal and background signal are separated from one another on the basis of angle of emergence, beam direction in the laser medium or polarization.

* * * * *